United States Patent [19]

Tanaka

[11] Patent Number: 5,022,050

[45] Date of Patent: Jun. 4, 1991

[54] SERIAL DATA COMMUNICATION DEVICE

[75] Inventor: Takeshi Tanaka, Hiroshima, Japan

[73] Assignee: Sharp Kabushiki Kaisha, Osaka, Japan

[21] Appl. No.: 374,868

[22] Filed: Jul. 3, 1989

[30] Foreign Application Priority Data

Jul. 5, 1988 [JP] Japan .................................. 63-168027

[51] Int. Cl.$^5$ ............................ H04J 3/00; H04L 5/14
[52] U.S. Cl. ......................................... 375/7; 378/109; 370/29; 455/88
[58] Field of Search ....................... 370/29, 103, 104.1, 370/109; 375/7, 8, 109; 455/75, 76, 79, 88

[56] References Cited

U.S. PATENT DOCUMENTS

| 3,618,025 | 11/1971 | Tomozawa | 375/7 |
| 3,852,534 | 12/1974 | Tilk | 375/8 |
| 4,404,672 | 9/1983 | Shimizu | 370/29 |
| 4,637,016 | 1/1987 | Ciancibello et al. | 370/29 |
| 4,720,827 | 1/1988 | Kanaji | 370/29 |
| 4,815,099 | 3/1989 | Shimatani et al. | 375/7 |

Primary Examiner—Benedict V. Safourek
Assistant Examiner—Young Tse

[57] ABSTRACT

A serial data communication device of a half-duplex communication system includes two communication units. One of the communication units has a counter for measuring a length of a remaining time during one sending/receiving period set for one-way data transmission (a period during one sending/receiving period W from the time when the communication unit receives all the send data from the other communication unit to the time to start data sending). A send frequency in data sending is determined to as a lower value practicable in the range in which no collision of the data occurs, depending on the length of the measured remaining time. The other communication unit is configured so as to receive the send data of one communication unit to extract the send frequency in synchronization with a serial clock signal having the same frequency as the send frequency and send the data. Accordingly, send frequencies of the communication units associated with communication are automatically set to be as lower values as practicable depending on the distance of communication, so that effects of fluctuations in time such as jitter on the send data is reduced to a minimum.

4 Claims, 3 Drawing Sheets

SERIAL DATA COMMUNICATION DEVICE

BACKGROUND OF THE INVENTION

1. Field of the Invention

The present invention relates generally to serial data communication devices for sending and receiving serial data, and more particularly to a serial data communication device for sending and receiving data through a single signal line, namely half-duplex communication.

2. Description of the Background Art

For communication of serial data, two systems, a full-duplex communication system and a half-duplex communication system, have been generally employed. The full-duplex communication system employs two signal lines: one for transmitting serial data in either way of sending or receiving, and the other for transmitting serial data in the other way. The full-duplex communication system is employed such as for communication of acoustic signals in real time.

However, there is a problem in the full-duplex system that the use of the two signal lines causes a large-scale construction of the signal lines for long distance communication. Furthermore, the requirement of the two signals in this system introduces an increase in the overall cost of communication equipment.

In the half-duplex communication system, two-way communication of sending and receiving data is carried out through a single signal line. That is, the data sending and receiving alternate for each predetermined period of time W. In other words, a single signal line is employed time-divisionally for the two-way communication.

FIG. 4 is a diagram illustrating the operation of communication between two communication units according to the half-duplex communication system of a conventional art. These two communication units are respectively represented as communication units a and b in the following description. Serial data Ai (i=1, 2, 3, . . . ) is sent from the communication unit a and received by the communication unit b. Serial data Bi is sent from the communication unit b and received by the communication unit a. The serial data Ai and Bi normally have the same data length with each other. Further, the serial data Ai and Bi are each transmitted during a period Wa of a predetermined period W (hereinafter referred to as one sending/receiving period), and are not newly provided to a signal line provided between the above described communication units a and b during a period Wb. The period Wb is provided to prevent the state that the communication units a and b both send the serial data simultaneously, namely collision of data. Data sent from one of the communication units reaches the other communication unit after a certain delay time on the signal line provided between the communication units. Therefore, in order to avoid the collision of the data, the data should not be sent from one of the communication units until the data of the communication unit to be sent during one sending/receiving period are all transmitted to the other communication unit. Accordingly, the period Wb is provided during the period from the time when the data sending from one communication unit ends to the time when the data sending from the other communication unit starts. As described above, the directions of transmitting the serial data are switched to each other for each one sending/receiving period W to carry out two-way communication in the half-duplex communication system.

For long distance communication in the conventional half-duplex communication system, the collision of the data occurs when the period Wb is shorter, because of an increased delay time of the serial data on the signal line. In order to avoid the collision of the data, the period Wb should be increased. The period Wa is reduced as the period Wb is increased, so that the serial data of a fixed data length should be transmitted in the reduced period Wa. Therefore, a transmission frequency of the serial data becomes higher, so that the data to be transmitted is susceptible to fluctuation in time such as jitter on a transmission path. Accordingly, it becomes difficult to achieve accurate transmission of the data and stable transmission of the serial data. Normally, the period Wb needs be increased to some extent, assuming that long distance communication is carried out during the period. Thus, data communication through a conventional communication device of the half-duplex system is more affected by fluctuation in time. That is, the conventional communication device of the half-duplex system is less reliable in communication.

The foregoing and other objects, features, aspects and advantages of the present invention will become more apparent from the following detailed description of the present invention when taken in conjunction with the accompanying drawings.

SUMMARY OF THE INVENTION

It is an object of the present invention to provide a serial data communication device which is less expensive in communication equipment and does not need a large scale construction for application thereof.

It is another object of the present invention to provide a serial data communication device with high reliability in communication.

It is a further object of the present invention to provide a serial data communication device capable of stable serial data communication.

It is a still further object of the present invention to provide a serial data communication device having transmission data less susceptible to fluctuation in time on a transmission path.

It is a further object of the present invention to provide a serial data communication device of a half-duplex communication system with high reliability in communication, which can carry out stable serial data communication and has the transmission data less susceptible to the fluctuation in time on the transmission path.

According to the present invention, the foregoing and other objects are attained by providing a novel and improved serial data communication system for bidirectional communication in which serial data having a predetermined constant data length are sent and received alternately for each predetermined constant period between first and second transceivers through a single signal line.

The first transceiver means comprises first clock signal generator for generating clock signals having a variable frequency. In the first transceiver a remaining period in the constant predetermined period between termination of reception of the serial data from the second transceiver means and termination of the predetermined period is determined. Then, in response to the remaining period determination output, the frequency of the clock signals generated from the first clock signal generating means is determined. The first transceiver further comprises a transmitter for transmitting the serial data based on the clock signal frequency as determined. On the other hand, the second transceiver comprises second clock signal generator responsive to the received serial data for generating clock signals having the same frequency as the transmit frequency which the received serial data has been transmitted based on and transmitter for transmitting the serial data based on the clock signals from said second signal generator.

In accordance with one aspect of the present invention, the remaining period is determined by counting reference pulses by a counter. The counter is responsive to termination of reception of the serial data from the second transceiver for starting its counting and is responsive to termination of the predetermined period for stopping its counting.

The frequency of the clock signals generated from the first generator is determined by including third clock signal generator for generating clock signals having a constant frequency, and a table for storing a predetermined relation between counted value and their corresponding dividing ratio. The dividing ratio information is read out from the table in response to the counted value counted by the counter. The frequency of the clock signals generated from the third clock signal generator is divided based on the frequency dividing ratio information as read out.

Therefore, according to the serial data communication device associated with the present invention, since send frequency of serial data is controlled optimally in carrying out two-way or bidirectional communication of the half-duplex communication system, stable sending/receiving of the serial data can be performed, resulting in high improvements in the reliability of communication.

DESCRIPTION OF THE PREFERRED EMBODIMENTS

Figure 1:
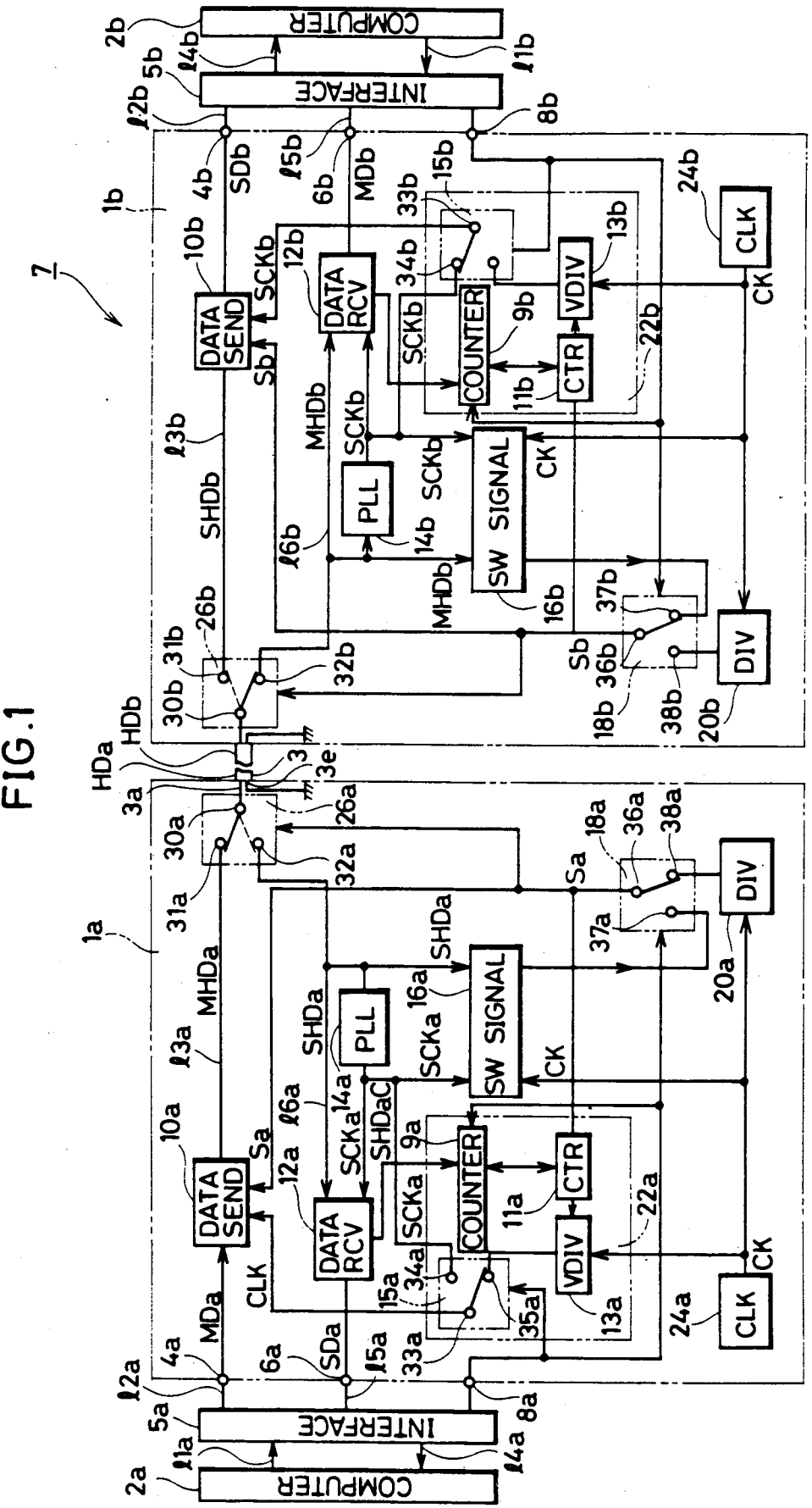
FIG. 1 is a schematic block diagram of a communication device illustrating one embodiment of the present invention.

FIG. 1 is a schematic block diagram illustrating the configuration of a communication device of one embodiment of the present invention. A communication device 7 comprises communication units 1a and 1b and a communication cable 3. The communication device 7 is, for example, provided between computers 2a and 2b. The computers 2a and 2b carry out communication of serial data via this communication device 7. The communication units 1a and 1b have the same internal configuration, and thus corresponding portions in the communication units 1a and 1b are each denoted by the combination of the same numerals and the letter a (indicating that those portions belong to the communication unit 1a) or b (indicating that those portions belong to the communication unit 1b).

The operation of the communication device 7 will now be described with a view that the computer 2a initiates data sending.

When the computer 2a initiates data sending, the computer 2a first provides a signal of the high level to a terminal 8a of the communication unit 1a via an interface 5a.

Data is sent from the computer 2a to the interface 5a via a line 1a. A data signal MDa (refer to FIG. 2) is derived from the interface 5a and provided to a terminal 4a of the communication unit 1a via a line 12a.

The communication unit 1a comprises a data sending circuit 10a, a data receiving circuit 12a, a phase-locked loop frequency synthesizer circuit (hereinafter abbreviated to a PLL circuit) 14a, a switching signal generating circuit 16a, a frequency divider circuit 20a, a send clock generating circuit 22a, a clock generating circuit 24a, and change-over switches 18a and 26a. With initiation of data sending, the signal of the high level provided to the terminal 8a is applied to the send clock generating circuit 22a and the change-over switch 18a.

The serial data signal MDa provided to the terminal 4a is applied to the data sending circuit 10a. This data sending circuit 10a receives a signal Sa from the change-over switch 18a and a serial clock signal CLK outputted from the send clock generating circuit 22a, which will be described later, and synchronizes the serial data signal MDa with the serial clock signal CLK while the signal Sa is at the high level, to output as a serial data signal MHDa to a line 13a. Therefore, a send frequency of the serial data signal MHDa is set to be the frequency of the serial clock signal CLK. The line 13a is connected to a contact 31a of the change-over switch 26a.

While the signal Sa is at the high level, the contact 31a of the change-over switch 26a is connected to a contact 30a. Therefore, the serial data signal MHDa from the data sending circuit 10a is provided to the communication cable 3 via the change-over switch 26a.

The communication cable 3, for example, comprises a line 3e, which is a signal line grounded in the communication units 1a and 1b, and a line 3a, which is a signal line connected to the change-over switch 26a in the communication unit 1a and the change-over switch 26b in the communication unit 1b. Consequently, the serial data signal MHDa provided to the line 13a is outputted to the communication unit 1b via the change-over switch 26a and the line 3a included in the communication cable 3.

As has been described, the data to be sent from the change-over switch 26a of the communication unit 1a is outputted in data sending from the computer 2a.

Next, the operation of the communication unit 1a in receiving data from the communication unit 1b will be described. First of all, a serial data signal outputted from the communication unit 1b via the communication cable 3 is applied to the contact 30a of the change-over switch 26a in the communication unit 1a. The communication unit 1a receives the serial data while the signal Sa from the change-over switch 18a is at the low level. In detail, since the change-over switch 26a renders the contacts 30a the low level, the serial data signal provided to the communication cable 3 from the communication unit 1b is applied as a serial data signal SHDa to the data receiving circuit 12a via the change-over switch 26a.

Further, this serial data signal SHDa is also applied to the PLL circuit 14a. The PLL circuit 14a locks the frequency of a clock signal SCKa, which is an output signal thereof to transmission frequency of the applied serial data signal SHDa. Accordingly, the clock signal SCKa having the same frequency as the transmission frequency of the serial data signal SHDa is applied to the data receiving circuit 12a.

The data receiving circuit 12a receives the serial data signal SHDa in synchronization with the clock signal SCKa and obtains a data signal SDa. The data receiving circuit 12a further provides the resultant data signal SDa to a terminal 6a and also applies a signal indicating the presence or absence of a receive signal to the send clock generating circuit 22a.

The data signal SDa provided to the terminal 6a is outputted to the computer 2a via a line 15a, the interface 5a and a line 14a.

As described above, the received data is applied to the computer 2a in data receiving.

The send clock generating circuit 22a for generating the above described serial clock signal CLK comprises a control portion 11a, a counter 9a including therein a reference pulse generator (not shown) for generating reference pulses to be counted, a variable frequency divider circuit 13a, and a change-over switch 15a.

With initiation of data sending from the computer 2a, the signal of the high level provided to the terminal 8a is applied to the change-over switch 15a and the counter 9a in the send clock generating circuit 22a. Accordingly, the change-over switch 15a renders the contacts 33a and 35a conductive. Another contact of change-over switch 15(a) is 34(a). Therefore, the send clock generating circuit 22a has the variable frequency divider 13a divide a clock signal CK from the clock generating circuit 24a, and then outputs a resultant signal to the data sending circuit 10a as a serial clock signal CLK.

A frequency dividing ratio in the variable frequency divider circuit 13a is determined by the control portion 11a. The control portion 11a is, for example, a one-chip general-purpose microcomputer. It receives a switching signal Sa from the change-over switch 18a as will be described later and takes out counter values from the counter 9a responsive to a change of the switching signal Sa from the low level to the high level, i.e. a rising of the signal, and thereafter resets the counter values of the counter.

During one sending/receiving period W, the period during which data is not transmitted through the communication cable 3 may have a minimum length as a marginal time period for completely sending all the data to be sent for one sending/receiving period despite a slight variation in the data sending time. Such a period is given by subtracting from one sending/receiving period W, the time required for completing data sending from one of the communication units and the time required for the sent data to reach the other communication unit, i.e. a delay time on the communication cable 3. The delay time on the communication cable 3 differs depending on the distance of communication. Therefore, the period during which the data is not transmitted in one sending/receiving period W differs depending on the distance of communication and not necessarily has the required minimum length as described above. On the other hand, the time required for completing data sending varies depending on the send frequency used when the serial data of a fixed length is sent. Therefore, if the send frequency is set to be an appropriate value according to the distance of communication, i.e. the actual length of the period during which the data is not transmitted in one sending/receiving period W, the period during which the data is not transmitted in one sending/receiving period W is set to be a required minimum length. Thus, the control portion 11a stores the data therein, in advance, indicating directly or indirectly a relation between the required minimum value of the period during which the data is not transmitted through the communication cable 3 in one sending-/receiving period W and the send frequency of the data corresponding to the value. The control portion 11a controls the frequency dividing ratio of the variable frequency divider circuit 13a as will be described later based on the stored data and the counter value of the counter 9a which is taken out.

The counter 9a is activated upon receiving the signal of the high level provided to the terminal 8a, and the starts counting reference pulses in response to the switching state of a signal SHDaC indicating the presence or absence of received data outputted from the data receiving circuit 12a, from the state that the received data exists to the state that the receive data does not exist.

The clock signal CK from the clock generating circuit 24a is also applied to the frequency divider circuit 20a and is divided by the frequency divider circuit 20a at a constant frequency dividing ratio. This divided signal which alternates between the high level and the low level for each sending/receiving period W is applied to the change-over switch 18a.

The serial data signal SHDa described above and the clock signal SCKa outputted from the PLL circuit 14a are also applied to the switching signal generating circuit 16a. The switching signal generating circuit 16a is also provided with the clock signal CK from the clock generating circuit 24a. The switching signal generating circuit 16a operates when data receiving starts from the communication unit 1a including the circuit, i.e. the communication unit 1a is in slave mode, while it does not operate when data sending starts from the communication unit 1a including the circuit, the communication unit 1a is i.e. in master mode. Since the signal of the high level is now provided to the terminal 8a in the communication unit 1a and thus the communication unit 1a is in the master mode, the switching signal generating circuit 16a does not operate.

While the communication unit 1a is not in the master mode, i.e. in the slave mode, the switching signal generating circuit 16a outputs a signal of the low level to a contact 37a of the change-over switch 18a until the first receive data is obtained. Further, when receiving data, the switching signal generating circuit 16a determines, in response to the data, transfer speeds of the data (4800 BPS (bit/second), 9600 BPS etc.) according to the clock signal SCKa and the serial data signal SHDa. Moreover, the switching signal generating circuit 16a alternately outputs signals of the high level and of the low level to the contact 37a for each predetermined sending/receiving period W according to the result of this determination of the data transfer speeds. However, when the signal provided to the terminal 8a is at the high level, i.e. when the communication unit 1a is in the master mode, contacts 38a and 36a are rendered conductive in the change-over switch 18a, and the change-over switch 18a outputs a signal from the frequency divider circuit 20a as a switching signal Sa, so that an output signal of the switching signal generating circuit 16a is not applied anywhere.

The communication unit 1b has the same configuration as the communication unit 1a described above. However, when the data sending starts from the communication unit 1a, namely, when the data receiving starts from the communication unit 1b, the computer 2b provides a signal of the low level to the terminal 8b via the interface 5b. That is, the signal of the low level is provided to the terminal 8b in the communication unit 1b to be in the slave mode. Accordingly, the contacts 36b and 37b rendered conductive in the change-over switch 18b. Therefore, a signal from the switching signal generating circuit 16b is outputted from the change-over switch 18b as a switching signal Sb.

Furthermore, since the signal of the low level provided to the terminal 8b renders contacts 33b and 34b conductive in the change-over switch 15b, a clock signal SCKb outputted from the PLL circuit 14b is outputted to the data sending circuit 10b as a serial clock signal. That is, in data sending, the PLL circuit 14b outputs to the data sending circuit 10b a clock signal SCKb with its frequency locked in the previous period, i.e. in data receiving.

As described above, the signal of the low level is provided to the terminal 8b in the communication unit 1b in the slave mode, so that an internal connection of the change-over switches 15b and 18b is set complementary with that of the communication unit 1a in the master mode.

Figures 2, 3:
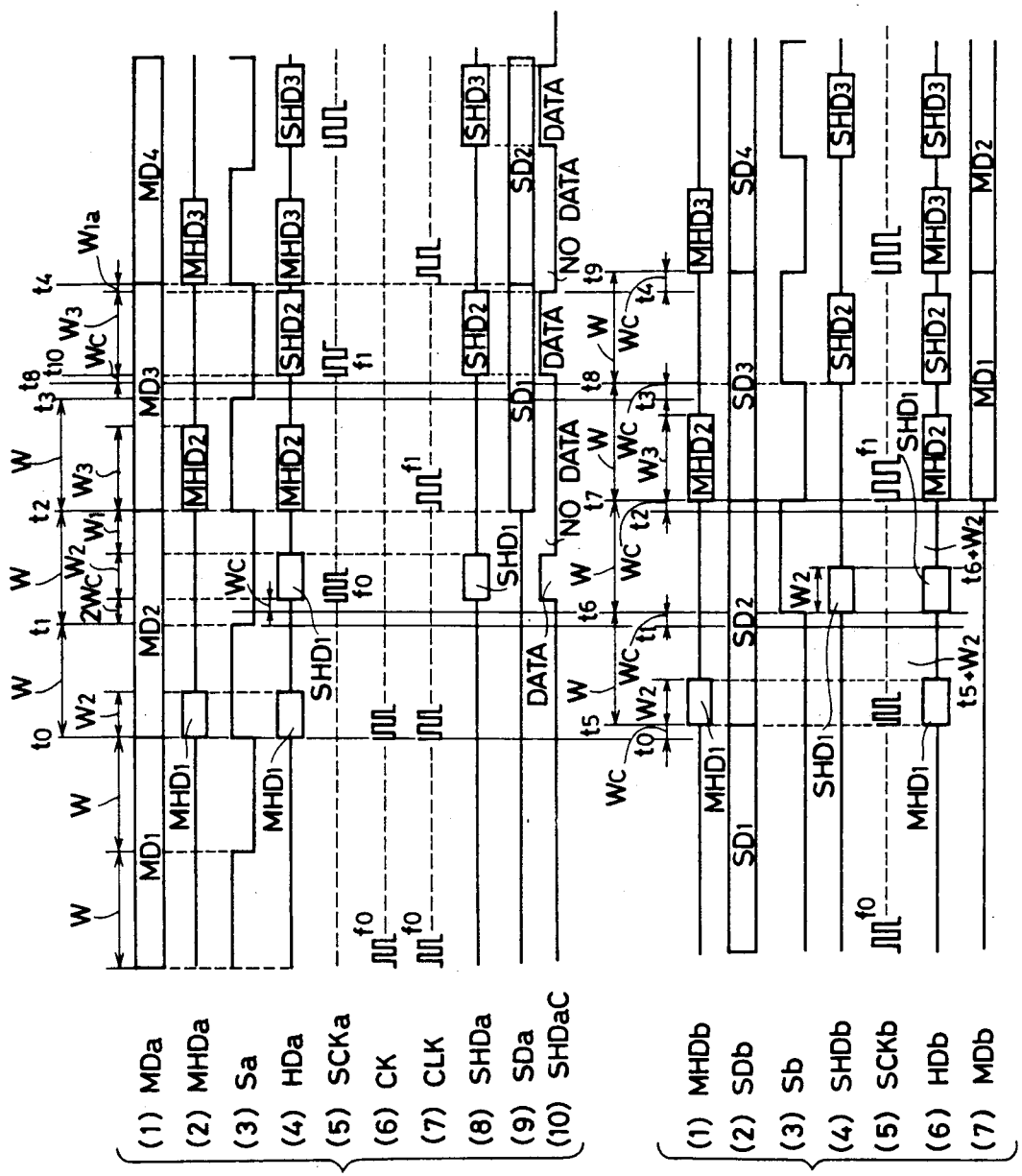
FIG. 2 is a time chart for illustrating the operation of one of communication units included in the communication device of the embodiment.
FIG. 3 is a time chart for illustrating the operation of the other communication unit included in the communication device of the embodiment.
Figure 4:
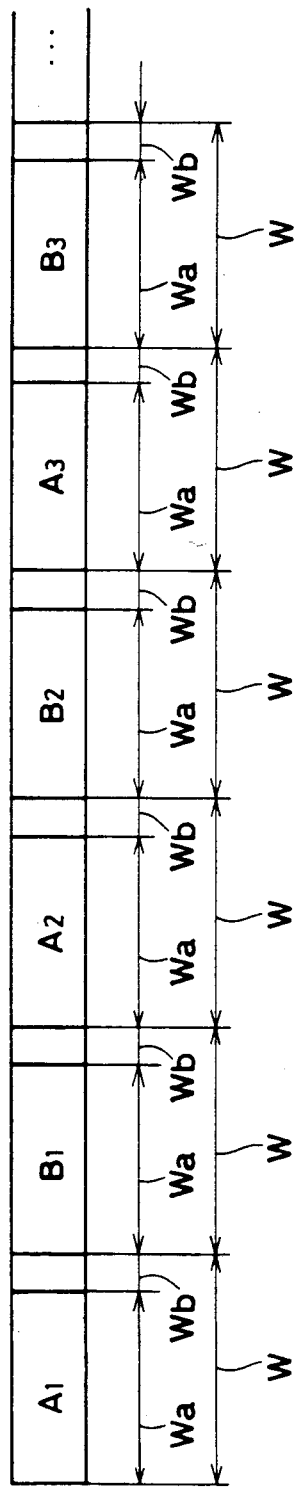
FIG. 4 is a time chart for illustrating the operation of a conventional communication device.

FIG. 2 is a time chart for illustrating the operation of the communication unit 1a in the master mode, and FIG. 3 is a time chart for illustrating the operation of the communication unit 1b in the slave mode. The operation of communications between the computer 2a and 2b will hereafter be described with reference to FIGS. 1, 2 and 3.

First of all, a data signal MDa is provided to the terminal 4a in the communication unit 1a. As for the following description, the data signal MDa is constituted by data MDi (i=1, 2, 3, . . . ) derived from the computer 2a via the interface 5a during two sending-/receiving periods 2W, as shown in FIG. 2 (1).

Since a signal of the high level is provided to the terminal 8a in the communication unit 1a with initiation of data sending, the data sending circuit 10a is provided via the change-over switch 15a with a serial clock signal CLK obtained from the clock signal CK from the clock generating circuit 24a, which is divided by the variable frequency divider circuit 13a. In addition, the data sending circuit 10a is provided via the change-over switch 18a with a switching signal Sa (see FIG. 2 (3) ) obtained from the clock signal CK from the clock generating circuit 24a, which is divided by the frequency divider circuit 20a having a constant frequency dividing ratio. The data sending circuit 10a sends a data signal MDa and synchronizes it with the serial clock signal CLK as a serial data signal MHDa from the time t0 when a serial clock signal Sa rises. At this time, the data sending circuit 10a sends serial data MHD1 constituting the serial data signal MHDa, taking a period W2 determined by the send frequency and the send data for one sending/receiving period W, as shown in FIG. 2 (2). Therefore, a signal HDa provided to the communication unit 1a terminal of the communication cable 3 emerges at such a timing as shown in FIG. 2 (4). At this time, the frequency dividing ratio in the variable frequency divider circuit 13a is set to be an initial value (e.g. 1), so that a clock signal CK (see FIG. 2 (6)) with a frequency f0 outputted from the clock generating circuit 24a becomes a serial clock signal CLK (see FIG. 2 (7)) as it is. As a result, the frequency of the serial clock signal CLK, namely the send frequency of the serial data signal MHDa is set to be the frequency f0.

Meanwhile, a signal of the low level is outputted as the switching signal Sb from the change-over switch 18b in the communication unit 1b in the slave mode. Therefore, a contact 30b is connected to a contact 32b in the change-over switch 26b, so that he communication unit 1b is at the receive state.

The serial data MHD1 outputted from the communication unit 1a is, as shown in FIG. 3 (1), received by the communication unit 1b as a serial data signal MHDb, taking the period W2 from the time t5 when a delay time Wc on the communication cable 3 has elapsed since the time t0. Since the PLL circuit 14b locks the frequency of its output signal to the send frequency of the serial data signal MHDb received by the communication unit 1b, the clock signal SCKb with the frequency f0 is outputted from the PLL circuit 14b shown in FIG. 3 (5).

At this time, a data signal SDb having the same configuration as the data signal MDa is provided to the terminal 4b in the communication unit 1b, as shown in FIG. 3 (2). In addition, the data sending circuit 10b is provided with the above described clock signal SCKb as a serial clock signal via a change-over switch 15b. The data sending circuit 10b is further provided with an output signal Sb (see FIG. 3 (3)) of a switching signal generating circuit 16b is further provided with an change-over switch 18b. The switching signal Sb rises to be at the high level at the time t6 when one sending-/receiving period W has elapsed since the time t5 when the data receiving is started from the communication unit 1b. In response to this, the contact 30b is connected to the contact 31b in the change-over switch 26b, so that the communication unit 1b is rendered to be at the send state. Therefore, as shown in FIG. 3 (4), the data sending circuit 10b sends a serial data signal SHD1 constituting the data signal SDb as the serial data SHDb, in synchronization with the clock signal SCKb taking the period W2 from the time t6. As a result, as shown in FIG. 3 (6), a signal HDb provided to the communication unit 1b terminal of the communication cable 3 is the signal MHD1 sent from the communication unit 1a during the period from the time t5 to the time t5+W2 and is the signal SHD1 from the time t6 to the time t6+W2.

As shown in FIG. 2 (4), the signal HDa provided to the terminal of the communication unit 1 of the communication cable 3 has its data provided with a deviation of a delay time Wc on the communication cable 3 form the time when the signal HDb (see FIG. 3 (6)) provided to the terminal of the communication unit 1b of the above described communication cable 3 has its data provided.

The send data signal SHD1 from the communication unit 1b is transmitted to the communication unit 1a after the period Wc on the communication cable 3. Accordingly, the communication unit 1a receives the serial data SHD1 sent from the communication unit 1b at the time when the time 2Wc, twice the delay time Wc on the communication cable 3 has elapsed since the time t1 when the switching signal Sa falls to be at the receive state, after one sending/receiving period W has passed since the time t0. That is, as shown in FIG. 2 (8), the serial data SHD1 is received by the communication unit 1a for the period W2. At this time, the PLL circuit 14b outputs a clock signal SCKa (see FIG. 2 (5)) locked to the send frequency of the receive data SHD1. Therefore, the data receiving circuit 12a receives the serial data SHD1, in synchronization with the clock signal SCKa from the PLL circuit 14a.

After that, data SD1 is outputted from the data receiving circuit 12a to the computer 2a via the interface 5a during the period from the time t2 when the switching signal Sa rises to the time t4 when two sending-/receiving periods 2W have elapsed, as shown in FIG. 2 (9).

When the data receiving circuit 12a has received all the receive data SHD1, namely when the receive data no longer exists, the data receiving circuit 12a applies a signal SHDaC (FIG. 2 (10)) indicating that the receive data no longer exists, to the counter 9a. In response to this, the counter 9a starts counting a reference pulse, and keeps counting until the switching signal Sa is reset by a rising control circuit 11a. Therefore, the counter 9a measures a period W1 from the time when the reception of the above described serial data SHD1 is completed to the time t2 when the switching signal Sa next rises, i.e. the remaining time of the one sending/receiving period W, after the send data of the communication unit 1b all reaches the communication unit 1a. The control portion 11a changes the frequency dividing ratio of the variable frequency divider 13a according to the length of this remaining period W1.

In detail, the control portion 11a includes a table storing data therein, which indicates directly or indirectly the relation between the period which the data is not transmitted through the communication cable 3 in one sending/receiving period as described above, i.e. a required minimum value of the remaining time W1 and the send frequency in data sending. For example, the table included in the control portion 11a store data which represents the relation between the actual remaining time W1 and the frequency dividing ratio of the valuable frequency divided circuit 13a for obtaining a serial clock signal which can makes the remaining time W1b attain a required minimum value. The control portion 11a reads out from the table the frequency dividing ratio which makes the remaining time W1 measured by the counter 9a attain a minimum value from this data, or calculates according to this data, and resets the frequency dividing ratio of the valuable frequency divider circuit 13a to the value thereof. Accordingly, the frequency of the serial clock signal CLK outputted to the data sending circuit 10a changes from the initial value f0 to an optimum value f1 depending on the delay time of the data on the communication cable 3. Thus, the frequency of the serial clock signal CLK at the time t2 changes to the f1 as shown in FIG. 2 (7). It is now assumed that the remaining time W1 is longer than its ideal value, so that the send data in one sending/receiving period W can be sent more slowly, taking a longer period than the period W2. In this case, the control portion 11a sets the frequency dividing ratio of the variable frequency divider 13a to be larger than the initial value so as to set the send frequency of the communication unit 1a, i.e. the frequency f1 of the serial clock signal CLK to be smaller than the initial value f0. Consequently, the data MD2 provided from the computer 2a to the terminal 4a via the interface 5a during the period from the time t0 to t2 is, as a serial data signal MHD2, synchronized with the serial clock signal CLK of the frequency f1 and outputted taking the period W3 which is longer than the previous sending period W2 from the time t2 (See FIG. 2 (2)).

The communication unit 1b starts receiving the serial data MHD2 from the time t7 when the delay time Wc on the communication cable 3 has passed since the time t2, in the same operation as in the previous reception of serial data MHD1. Accordingly, the PLL circuit 14b is supplied with the serial data MHD2, and locks the frequency of its output signal SCKb to the transmission frequency f1 of the serial data MHD2 until the next receive data is supplied. Therefore, the data sending circuit 10b synchronizes serial data SHD2 with the serial clock signal SCKb of the frequency f1 and sends the data, taking the period W3 after the time t8 when the switching signal Sb rises after the reception of the serial data MHD2 is completed (see FIG. 3 (4)).

In the communication unit 1b, the serial data MHD1 received in the period W2 from the time t5 is provided to the computer 2b from the data receiving circuit 12b via the interface 5b as data MD1 constituted by a data signal MDb, at the time t9 when two sending/receiving periods 2W has elapsed since the time t7, as shown in FIG. 3 (7).

As shown in FIG. 2 (8), serial data SHD2 outputted from the communication unit 1b to the communication cable 3 is received in the communication unit 1a during the period W3 from the time t10 when the delay time Wc has elapsed since the time t8. At this time, a period W1a from the time when the receiving of the serial data SHD2 is completed to the time t4 when the switching signal Sa next rises, becomes shorter than the above described remaining time W1 and attains an ideal minimum value. Therefore, the control portion 11a determines the frequency dividing ratio in the variable frequency divider circuit 13a to the same value as the previous one. Therefore, the ratio is kept at the value determined in the previous data sending and thus the frequency of the serial clock signal CLK remains to be the f1. Of course, when the period W1a is deviated from its ideal length for some reason, the control portion 11a determines again the ratio in the variable frequency divider circuit 13a to such a value to have an ideal length during the period W1a.

As shown in FIG. 2 (9), during the period from the time t2 to the time t4, the serial data SHD1 received in the described operation is synchronized by the receiving circuit 12a and provided to the terminal 6a as data SD1 constituting a signal SDa provided to the terminal 6a, and outputted to the computer 2a via the interface 5a. Therefore, the periods when the respective data constituting the data signal SDa emerge are illustrated in FIG. 2 (9).

Communications between the computers 2a and 2b are hereafter carried out with the above described operations repeated.

As has been described heretofore, this embodiment is configured such that the communication unit 1a changes the transmission frequency of the serial data, according to the delay time Wc on the communication cable 3. Accordingly, the transmission frequency of the data is set to be lower so that as the delay time Wc on a transmission path decreases, the remaining time during one sending/receiving period W is reduced as much as possible. Therefore, the transmission data is prevented from being affected by fluctuations in time such as jitter on the communication cable 3, resulting in reliable communication.

Communication between the computers 2a and 2b has been described in this embodiment; however, any electronic apparatuses capable of data communication may be employed not limitative to such computers. Furthermore, the configurations of the send clock generating circuits 22a and 22b are presented as one example and thus not limited to this embodiment. For example, the send clock generating circuit may comprise, not employing the variable frequency divider circuit, a circuit for generating a clock signal of a variable frequency and a control portion for controlling the frequency of the clock signal, which, for example, having the similar function as one in the above described embodiment, and thus an output signal of the clock signal generating circuit with the variable frequency may be applied directly to the data sending circuit as a serial data clock signal.

What is claimed is:

1. A serial data communication system for bidirectional communication in which serial data having a predetermined constant data length are sent and received alternately for each predetermined constant period between first and second transceiver means through a single signal line;

said first transceiver means comprising first clock signal generating means for generating clock signals having a variable frequency;

means for determining a remaining constant predetermined period between termination of reception of the serial data from said second transceiver means and termination of said predetermined period;

clock signal frequency determining means responsive to the remaining period determination output from said remaining period determining means for controlling the frequency of the clock signals generated from said first clock signal generating means; and transmitter means for transmitting the serial data based on the clock signal frequency determined by said clock signal frequency determining means;

said second transceiver means comprising second clock signal generating means responsive to the received serial data for generating clock signals having the same frequency as the transmit frequency which the received serial data has been transmitted based on; and transmitter means for transmitting the serial data based on the clock signals from said second signal generating means.

2. A serial data communication system in accordance with claim 1, wherein said remaining period determining means comprises counter means for counting reference pulses, said counter means being responsive to termination of reception of the serial data from said second transceiver means for starting its counting and being responsive to termination of said predetermined period for stopping its counting:

said frequency determining means comprises third clock signal generating means for generating clock signals having a constant frequency;

a table for storing a predetermined relation between counted value and their corresponding dividing ratio;

reading means for reading the dividing ratio information from said table in response to the counted value counted by said count means; and frequency dividing means for dividing the frequency of the clock signals generated from said third clock signal generating means based on the frequency dividing ratio information read out from said reading means.

3. A serial data communication system in accordance with claim 1, wherein said second clock signal generating means included in said second transceiver means comprises phase locked loop means for extracting the send frequency of the serial data sent from said first transceiver means for locking the extracted send frequency to a send frequency of the second transceiver means.

4. In a serial data communication system for bidirectional communication in which serial data having a predetermined constant data length are sent and received alternately for each predetermined constant period between first and second transceiver means through a single signal line, a method of determining data rate for sending serial data from said first transceiver means to the second transceiver means, comprising the steps of:

(a) receiving in the first transceiver means the serial data from said second transceiver means;

(b) determining a remaining period in the predetermined constant period between termination of reception of the serial data and termination of said predetermined period;

(c) generating clock signals from a clock signal generating means; and (d) controlling the frequency of the clock signals generated from the clock signal generating means in response to an output of the remaining period in step b so that the generated clock signals are variable frequency clock signals.

* * * * *